Figure 1:
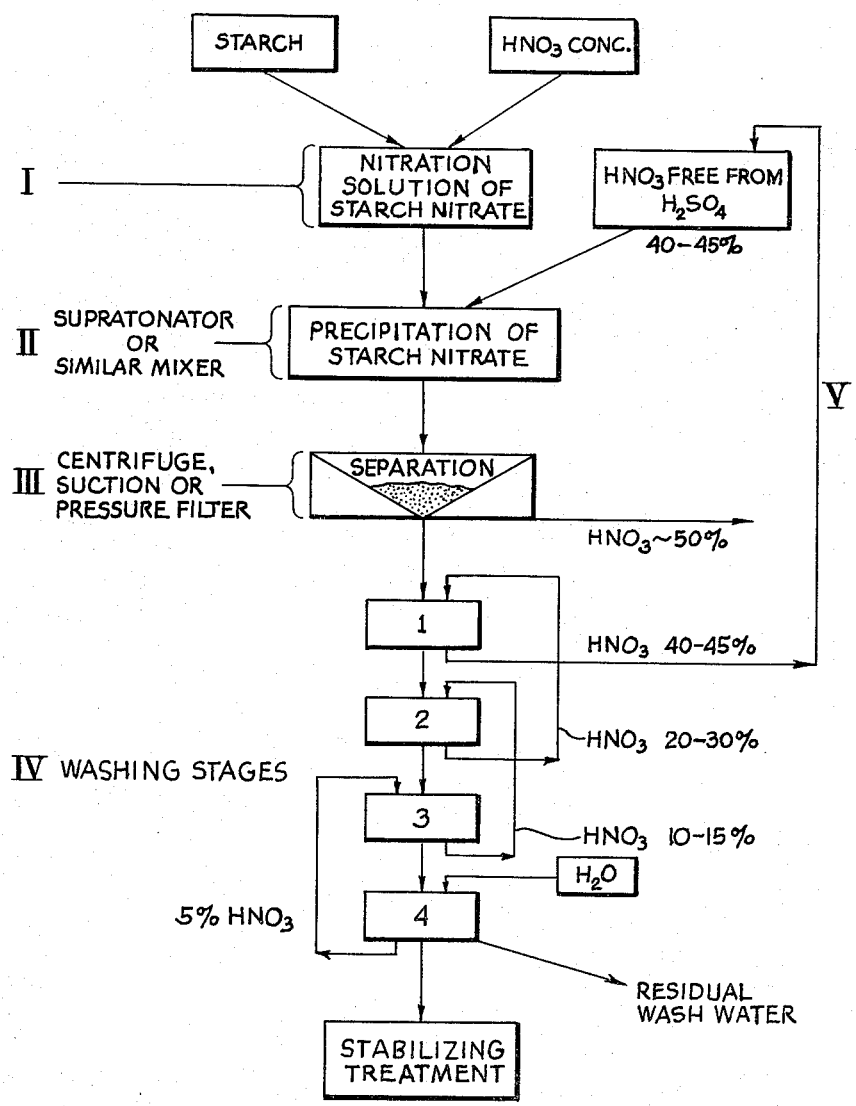

Aug. 8, 1961  W. ZIMMERMANN ET AL  2,995,549
PROCESS FOR MAKING STARCH NITRATES
Filed July 7, 1958  2 Sheets-Sheet 1

INVENTOR
WERNER ZIMMERMANN
GUSTAV-ADOLF SIEPER
LOTHAR REINHARDT
BY Toulmin & Toulmin
ATTORNEYS

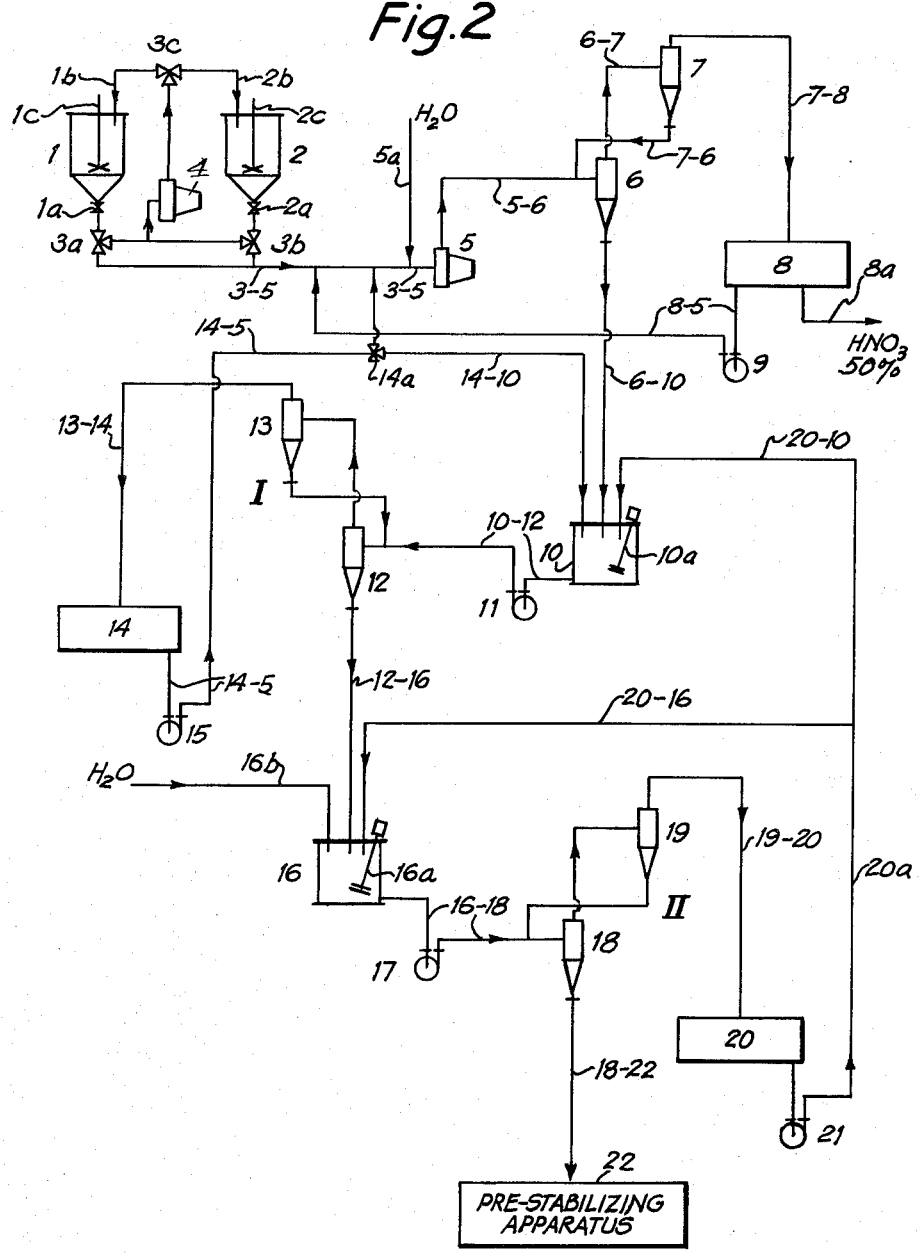

2,995,549
PROCESS FOR MAKING STARCH NITRATES
Werner Zimmermann, Aschau, Kreis Muhldorf, Upper Bavaria, Gustav A. Sieper, Munich, and Lothar Reinhardt, Aschau, Kreis Muhldorf, Upper Bavaria, Germany, assignors to Wasag-Chemie Aktiengesellschaft, Essen, Germany
Filed July 7, 1958, Ser. No. 746,863
5 Claims. (Cl. 260—233.5)

This invention relates to a novel process for making starch nitrates.

It is an object of our invention to provide a novel process for making starch nitrates which are substantially more stable than those obtained from the conventional production of the same with a nitration mixture containing nitric and sulfuric acid.

It is another object of our invention to provide a new process for producing starch nitrates, which process permits the recycling of the nitration and precipitation liquids in the form of pure nitric acid solutions into the process.

The known processes for making starch nitrates, also referred to as nitro starch, can be divided into two groups, the more frequent ones of whch lead to a solution of starch nitrates in the liquid nitration agent, while the others lead to the formation of undissolved starch nitrates.

The latter group of processes known in the art, suffers from the drawbacks that industrially impracticable long nitration time intervals are required and, furthermore, that in spite of these long nitration periods, nonuniformly esterified products are obtained which are unsuitable for most purposes such as the preparation of lacquers and varnishes, in which unobjectionable starch nitrates are largely used.

This invention is, therefore, concerned with the first-mentioned group of processes which comprises, as an intermediary stage in the production of starch nitrates, the formation of a solution of the latter in the nitration liquid, and the subsequent precipitation of the starch nitrates from this solution by dilution of the same with a liquid precipitating agent in which the starch nitrates are insoluble.

It is well known to use, as a nitration agent, concentrated nitric acid, mixtures of nitric acid with sulfuric acid, mixtures of nitric acid with phosphoric acid with or without a certain water content, and finally mixtures of nitric acids of different concentrations with chlorinated hydrocarbons.

Various liquids have been used in the art as the aforesaid precipitating agent. For instance, the British Patent 21,771 teaches the use of nitric acid as the nitrating liquid and gaseous sulfur trioxide as the precipitating agent. According to another known process, starch nitrates are obtained in the form of a solution in nitric acid, and liquid concentrated sulfuric acid is then added, under cooling, to the solution as a precipitating agent, whereupon the starch nitrates will precipitate.

Yet another known process, according to the German Patent 57,711, teaches the use of waste acids from the manufacture of nitroglycerine, as precipitating agent in the production of starch nitrates. These waste acids are known to contain nitric acid, sulfuric acid, water, and always some nitroglycerine. The precipitated nitro starch is then stabilized by impregnation with aniline.

A further number of known processes of this type are described by Worden in "Technology of Celluloseesters," volume I, part 3, page 1823 (1920), and comprise similar features as the above mentioned processes.

All known processes suffer from serious drawbacks, which are discussed in detail in the literature. Firstly, the starch nitrates produced by these processes do not correspond to the present strict standards of stability, and expensive additional treatment is required, such as dissolving the starch nitrates in organic solvents and subsequent reprecipitation, in order to improve their stability. Secondly, no economical recovery of the nitration liquid by separation from the precipitated starch nitrates and its direct return to the work cycle of the nitration, precipitation and separation steps envolved in the production of starch nitrates is possible.

These drawbacks are overcome, and the above stated objects are attained by the novel process of our invention, which comprises, as a main feature, the use of a pure aqueous nitric acid having a concentration of at least 40% and preferably between 45 and 55% by weight of $HNO_3$ in the diluted acid, as the precipitating agent.

We have discovered that starch nitrates obtained in the form of a solution in concentrated $HNO_3$, of at least 90% by weight, can be precipitated surprisingly enough without a degradation of the starch nitrates or a reduction in the total yield of starch nitrates, by adding the solution to the aforesaid diluted nitric acid, which is pure, apart from containing water, i.e. which is free above all from sulfuric acid, nitroglycerine and the like detrimental constituents.

The latter fact results in the production of starch nitrates of much higher stability which, after separating and washing steps to be described hereinafter, can be stabilized much more easily than the conventionally produced starch nitrates containing sulfuric acid besides nitric acid as impurities. The stabilization of the starch nitrates produced according to our invention can thus be easily performed by applying only the conventional washing and boiling steps used in the manufacture of nitro cellulose.

Furthermore, the fact that diluted, pure nitric acid alone is used as the precipitating agent, constitutes an essential simplification of the known processes, and makes possible, for the first time, the direct return of the mother acid separated from the precipitated starch nitrates, into the precipitation step of the work cycle of the process according to our invention.

According to another important feature of our invention, the separation of the precipitated starch nitrates from the mother acid, is followed by a stepwise washing process with nitric acid of decreasing concentration in counter-flow to the starch nitrates. We have found that this measure has a favorable influence on the stability of the final product, for the gradual reduction in the acid concentration thus achieved, helps to avoid a sudden de-gelling (syneresis) of the starch nitrates, which would inevitably lead to the occlusion of acid and consequently decrease the stability of the end product.

Other advantages and characteristic features of the invention will become apparent from the description thereof in connection with the accompanying drawings in which FIG. 1 is a flow sheet illustrating the process according to the invention when carried out discontinuously, and FIG. 2 is a flow sheet illustrating the same process in a continuous mode of operation.

The discontinuous process illustrated in FIGURE 1 comprises the following steps:

(I) A starch nitrate solution is obtained by dissolving starch obtained from the usual raw materials such as potatoes, corn (maize) or wheat and the like, in a highly concentrated nitric acid of at least 90% by weight $HNO_3$ content, as the nitrating agent.

The ratio by weight of starch to acid may vary greatly depending on the exact concentration of the acid.

The nitration time depends on the temperature used, and the latter is chosen, in turn, dependent on the desired viscosity degree of the starch nitrate. A starch nitrate of very low viscosity can be obtained by working at a temperature of about +35° C.

The following Table A shows the interdependence of these factors:

TABLE A

| Viscosity | Temperature (° C.) | Nitration time, minutes |
| --- | --- | --- |
| K=27 (low viscous) | +35 | 30 |
| K=35 (medium viscous) | +20 | 30 |

The viscosity is measured in a solution of acetone (2 g. nitrostarch in 100 cm.$^3$ acetone).

(II) After the nitration step is terminated, the resulting solution of starch nitrate in nitric acid is added, according to our invention, to a precipitation bath of aqueous nitric acid free from sulfuric acid and having a concentration of above 40%, such as, for instance, 50% by weight, in order to precipitate the starch nitrate from the solution.

The addition of the solution may be carried out by pouring the same in a thin jet into the strongly agitated precipitation bath. Or the solution may be sprayed into the bath through a plurality of fine nozzles, for instance, so called "Schlick" nozzles, while the bath is stirred vigorously by means of a stirrer or mixer.

We prefer to use an apparatus of the "supratonator" type as illustrated and described, for instance, in "Chemie-Ingenieur-Technik" (1952), No. 5, pages 249 and 250, and ibidem (1954), No. 3, page 123. This device is used in the cellulose industry. We use the same, for the first time, in the precipitation of a nitrated product, because we have found that the characteristic property of the supratonator of defibrating and "unfelting" the starch nitrate through the hydrodynamic oscillations which it produces in the liquid, without reducing the size of its particles, has a favorable effect on the precipitating time, by shortening the same, as well as on the washability and the stability of the precipitated product. Thus, washability is simplified and stability of the starch nitrate further augmented by the use of the supratonator. The ratio of solution to precipitation bath is about 1:15 by volume.

(III) The precipitated starch nitrate is a fine powder which is separated from the mother acid by centrifuging, in a suction cell filter, a pressure filter, or the like, whereby the bulk of the mother acid is removed in the form of an aqueous nitric acid having a concentration of about 50% by weight, and a high degree of purity.

This technically pure nitric acid may be returned immediately to the next following precipitation bath, or, if this is not desired, it may be used in part, or entirely, for different purposes in other chemical industrial processes such as the manufacture of ammonium nitrate and the like.

(IV) The starch nitrate in the filter or centrifugate still contains a certain portion of mother acid, which is recovered, according to the next following step in the process of our invention by a stepwise washing, for instance, in four stages, from which there is obtained an aqueous nitric acid of about 40–45% concentration, which may also be returned to the process or used otherwise as described above.

The washing step is carried out counter-currently by introducing fresh water to the lowermost stage (4) in the flow sheet, thus washing the stage (4) product until it shows neutral reaction. Ultimately the wash water from this stage has such low concentration of $HNO_3$ that it can be discarded after eventual neutralization.

The initial wash water from this stage (4) with a satisfactory concentration of $HNO_3$ is advanced to stage (3) where it is used to wash the product from stage (2), and so forth until the wash liquid obtained from stage (1), i.e. the above-mentioned nitric acid of 40–45% $HNO_3$, is returned to the process (V).

While the above described process comprises steps for the separation and washing of the starch nitrates which are carried out discontinuously, larger amounts of the material are preferably handled in a continuous process.

This continuous process comprises as essential features that the starch nitrates are dissolved and precipitated in a supratonator system providing for continuous flow, and that the separation of the precipitated starch nitrates and the recovery of the nitric acid as well as the washing steps are carried out in an apparatus which is well known as "hydrocyclon" in the cellulose and starch industries.

The construction and operation of these hydrocyclons is described in detail in "Chemie-Ingenieur-Technik," 6 (1953), pages 331 to 341, published by Dr. H. Travinski (Dorr-G.m.b.H. Wiesbaden).

FIGURE 2 illustrates schematically a plant used for carrying out the continuous process in practice. This plant comprises reaction vessels 1 and 2 provided with bottom discharge valves 1a and 2a respectively. Each of these vessels is provided with an agitating mechanism 1c and 2c respectively. Three-way cocks 3a, 3b and 3c connect a first supratonator 4 with discharge valves 1a and 2a and return inlet tubes 1b and 2b, leading back to vessels 1 and 2 respectively. Three-way cocks 3a and 3b are further connected via pipe line 3—5 to the inlet of a second supratonator 5. The outlet of the latter is connected via line 5—6 to the inlet of a hydrocyclon 6. One of the outlets of which is connected via line 6—10 to a washing vessel 10. The other outlet of hydrocyclon 6 is connected via line 6—7 to the inlet of a second hydrocyclon 7. The bottom outlet of the latter hydrocyclon is connected by way of return pipe 7—6 to the inlet of the first hydrocyclon 6. The other outlet of hydrocyclon 7 is connected via line 7—8 to a storage tank 8. Storage tank 8 is connected by return line 8—5 via circulation pump 9 to the inlet of the second supratonator 5, and can be charged continuously from surplus nitric acid through line 8a.

Washing vessel 10 is provided with a stirring means 10a. Its bottom outlet is connected through line 10—12 via a pump 11 to the inlet of a second hydrocyclon group comprising hydrocyclons 12 and 13 which are connected with each other in the same manner as hydrocyclon pair 6 and 7. The bottom outlet of hydrocyclon 12 is connected via line 12—16 to a second washing vessel 16 which is provided with stirring means 16a. The top outlet of hydrocyclon 13 is connected via line 13—14 to a storage tank 14 which is connected in turn through line 14—5 via pump 15 to the inlet of supratonator 5 in a similar manner as reservoir 8.

Washing vessel 16 is further provided with a water feeding pipe 16b, and its bottom outlet is connected through line 16—18 via pump 17 to the inlet of hydrocyclon 18 pertaining to a third hydrocyclon group comprising further a second hydrocyclon 19. Hydrocyclons 18 and 19 are connected with each other in the same manner as the first hydrocyclon pair 6 and 7 and the second hydrocyclon pair 12 and 13. The top outlet of hydrocyclon 19 is connected via line 19—20 to storage tank 20, and the outlet of the latter is connected through branched line 20a via pump 21 and through line branches 20—10 to washing vessel 10, and line branch 20—16 to washing vessel 16. The bottom outlet of hydrocyclon 18 is connected via line 18—22 to a prestabilizing apparatus 22 of conventional construction.

The invention will be further illustrated by the following examples for carrying out the discontinuous and continuous process, respectively. It will be understood that these examples are not to be considered as limitative of the invention in any way or form.

Example I 500 grams (g.) of corn starch having a moisture content of less than 2% are added to 1.7 liters of nitric acid having a specific gravity $D_4^{20}$ 1.5008 corresponding to a $HNO_3$ content of about 98% in an autoclave of a volume of about 4 liters and provided with a stirrer. The addition of the starch to the nitric acid is carried out under constant stirring during about 30 minutes (step I in FIG. 1), while the temperature of the acid rises from initially approximately 20° C. to about 35° C. The contents of the autoclave are then maintained at this latter temperature by heating for another 30 minutes. The nitration step is then terminated and a clear solution is obtained. The pressure in the autoclave at the end of the nitration step is about 1 atmosphere. By means of compressed air having about 1 atmosphere excess pressure, above that in the autoclave the clear solution is pressed from the autoclave through an outlet pipe ending in a nozzle or nozzles having a bore of about 0.5 millimeter (mm.) diameter and out of the nozzle or nozzles into a recipient filled with a precipitation bath of about 25 liters of nitric acid having a concentration of 45% by weight of $HNO_3$ (step II). The bath is stirred during the precipitation step.

The precipitated starch nitrate having an average grain size of about 0.1 mm. is then separated from the bulk of the aqueous nitric acid now having a concentration of about 50%, by means of a suction filter.

The residual nitric acid of the last mentioned concentration still retained in the filter cake, is removed from the latter by displacement with 2 liters of a nitric acid having an $HNO_3$ content of 30%, and the residual acid of the latter concentration is finally displaced by 1.8 liters of an acid having an $HNO_3$ content of 15%. The latter acid is then displaced with 1.6 liters of an acid containing about 5% of $HNO_3$ (step III, 1–3).

The different acids of varying $HNO_3$ contents, i.e., 40 to 45% from the first washing stage, 20 to 30% from the second, and 10 to 15% from the final stage, can be recycled to be used in the stepwise washing of one of the following nitrated charges.

The finally obtained acid containing about 5% of $HNO_3$ is then washed out with pure water. The first portion of this wash water which contains about 5% of $HNO_3$ may be used for other washing steps with that type of acid, while the subsequent portions of the wash water are discarded (IV).

In this manner the last traces of $HNO_3$ in the starch nitrates are removed, and the final product has a nitrogen content of 11.8% and a viscosity of about $K=27$ when dissolved in pure acetone (2 g. nitrostarch in 100 cm. acetone). The yield of the final product is about 790 g. which corresponds to 98% of the theoretically expected amount.

Example II 50 kg. of a dried potato starch having a moisture content not exceeding 2% by weight are introduced under constant stirring into reactor vessel 1 which is filled with 1000 kg. of nitric acid having a concentration of 98% $HNO_3$. The introduction is effected in about 15 minutes while the temperature in the reactor vessel is maintained by cooling at maximally 20° C. Thereafter, the resulting suspension which still contains undissolved starch is circulated during 45 minutes through supratonator 4 by way of three-way cocks 3a and 3c. In the supratonator the agglomerated undissolved starch is disintegrated and a progressive nitration of the same is ensured. During this entire step, which corresponds to the supratonator treatment II, first stage, of the flow sheet in FIGURE 1, cooling of the reactor vessel 1 is continued to maintain the temperature in the same at maximally 20° C. The nitration is then terminated and a completely clear solution of starch nitrates in nitric acid is obtained. This solution is now released slowly, in the course of one hour, through line 3—5 into the second supratonator 5 in which the solution is mixed successively with 11,000 kg. of a nitric acid having a concentration of about 50% by weight, which is obtained from storage tank 8 via circulating pump 9, thereafter with 1,280 kg. of a nitric acid having a concentration of about 26% by weight which is obtained from storage vessel 14 of the first washing stage via pump 15, and then with 300 liters of water from line 5a. During the admixture of the diluted nitric acid from lines 8—5, 14—5 and the subsequent admixture of water of line 5a, the starch nitrate solution continues to be treated in supratonator 5. Conventional control means are provided for maintaining the ratio of the nitration mixture to dilute acids and/or the added water constant during the treatment in supratonator 5. By the admixture of diluted nitric acids, the starch nitrate is precipitated in supratonator 5 from its solution in concentrated nitric acid in the form of fine particles of uniform grain of about 0.1 mm. During this stage of the treatment, the next following charge has already been introduced into reactor vessel 2 and dissolved in supratonator 4.

Supratonators 4 and 5 are preferably of the type containing each 240 chambers and are operated at 3,000 r.p.m. so as to create hydrodynamic oscillations having a frequency of about 12,000 oscillations/sec.

The suspension of starch nitrates in a nitric acid of 50% concentration, produced in supratonator 5, is separated in the hydrocyclons 6 and 7 due to the excess pressure of about 2 atmospheres above normal generated in the supratonator itself into (a) a thickened suspension consisting of about 80 kg. of starch nitrates resulting from the originally introduced 50 kg. of starch, in mixture with about 800 kg. of a nitric acid of about 50% concentration, which mixture flows through line 6—10 to the washing vessel 10, and (b) about 12,780 kg. of a substantially clear nitric acid of about 50% concentration which is withdrawn at the upper outlet of hydrocyclon 7 and returned through line 7—8 to storage tank 8. This part of the continuous treatment corresponds to the second stage under step II in FIGURE 1.

The now following washing steps A and B correspond to washing steps III and IV in the flow sheet of FIGURE 1.

The thickened suspension from the bottom outlet of hydrocyclon 6 is conveyed via line 6—10 to washing vessel 10 in which it is diluted, during the course of one hour, with 1,280 kg. of a nitric acid having a 10% concentration and drawn from storage tank 20 of washing step B via pump 21 and simultaneously with another 10,500 kg. of a nitric acid of about 26% concentration drawn from storage tank 14 via pump 15, and branch line 14—10 after the required adjustment of three-way cock 14a.

Conventional control means are again provided for maintaining the mixture ratio constant during the time of treatment in vessel 10. Concurrently with this treatment, pump 11 withdraws diluted suspension from the bottom of vessel 10 and is conveyed with an excess pressure of 2 atmospheres above normal to hydrocyclons 12 and 13, in which it is separated into (c) a thickened suspension consisting of about 80 kg. starch nitrates in about 800 kg. of a nitric acid having 26% concentration, and (d) about 11,780 kg. of a clarified nitric acid having a concentration of about 26% $HNO_3$. The thickened suspension (c) flows into the washing vessel 16 from the bottom outlet of hydrocyclon 12 through line 12—16 while the clarified diluted nitric acid is returned via line 13—14 to storage tank 14.

The circulation of the large amounts of nitric acid having the last-mentioned concentration, is necessary in order to maintain the minimum amount of liquid required in the hydrocyclons for effecting an unobjectionable separating effect.

The washing step B is operated analogously to washing step A. However, the dilution of the thickened suspension obtained from line 12—16 is effected with 1,280 liters of water from the main and 10,000 kg. of nitric acid having a 10% concentration which is obtained from storage tank 20 via branch line 20—16. The thick suspension is charged at the bottom end of hydrocyclon 18, is not washed further, but directly introduced into the prestabilizing apparatus 22 in which the residual nitric acid of the suspension is diluted further until a concentration of 5 g. of $HNO_3$ per liter is attained. By boiling the starch nitrates in this weak nitric acid, the nitrates are satisfactorily prestabilized.

About 11,280 kg. of a clear nitric acid of 10% concentration are withdrawn at the top of hydrocyclon 19 and returned via line 19—20 to storage tank 20.

In the manner described hereinbefore, it is possible to produce starch nitrates in a fully continuous process up to the stabilization step in prestabilizer 22. This last step which is carried out in a conventional manner, is preferably effected discontinuously after a sufficient amount of starch nitrate has been accumulated.

The operation of the plant illustrated in FIGURE 2 can be started either with separately manufactured nitric acids having concentrations of 50%, 26% and 10% and being stored in the respective storage tanks, or the process is initiated as described hereinbefore, and the various dilution steps are carried out by adding pure water during the process through lines 5a and 16b, until the desired concentrations are obtained. Once the plant is in full operation, it is possible to withdraw currently nitric acid having a 50% concentration from storage tank 8 in amounts of about 1,780 kg. per charge of 50 kg. of starch (80 kg. of starch nitrates). This excess volume of nitric acid having a 50% concentration is derived mainly from the amounts of concentrated nitric acid required for dissolving the starch nitrates. The amounts of diluted acids in storage tanks 14 and 20 remain substantially unchanged throughout the operation of the plant. The recovery of nitric acid thereby attains a value of about 92%, the loss of about 8% being exclusively due to the fact that nitric acid having a concentration of about 10% $HNO_3$ is being removed from the process together with the starch nitrates through line 18—22 into the prestabilizer 22.

The final product of about 80 kg. of starch nitrates has a nitrogen content of 13.3% and a viscosity of about $K=35$ (measured with a solution of 2 g. of starch nitrates in 100 ccs. of acetone).

It is possible to attain by the process according to our invention yields of starch nitrates amounting to about 98%.

The products obtained according to the process of the invention are not yet sufficiently stable, but can be stalized much more easily by known processes, or by the process described in our co-pending application Ser. No. 726,680, filed April 7, 1958, now abandoned, than the starch nitrates obtained by any other known method.

It will be understood that this invention is susceptible to further modification and, accordingly, it is desired to comprehend such modifications within this invention as may fall within the scope of the appended claims.

What is claimed is:

1. In a process for producing starch nitrates by first dissolving starch in highly concentrated nitric acid, forming a starch nitrate solution, and precipitating the starch nitrates in a precipitating bath, the improvement which comprises having as the precipitating bath a solution consisting essentially of aqueous nitric acid of from 40 to 55% concentration by weight of $HNO_3$.

2. The improved process as described in claim 1, wherein the aqueous nitric acid concentration is about 50% by weight of $HNO_3$.

3. The improved process as described in claim 1, wherein the starch nitrate solution is finely distributed into the aqueous nitric acid solution by applying hydrodynamic oscillations having a frequency of about 12,000 oscillations per second.

4. A process for producing starch nitrates which comprises the steps of first dissolving starch in nitric acid of at least 90% concentration by weight of $HNO_3$, forming a starch nitrate solution, then precipitating said starch nitrate in a precipitating bath consisting essentially of aqueous nitric acid of from 40 to 55% concentration by weight of $HNO_3$, and thereafter separating the bulk of the nitric acid from the precipitated starch nitrates, and removing residual acid from the latter by counter-current stepwise washing with water, thereby obtaining a recovered nitric acid solution of about 50% by weight of $HNO_3$.

5. A process for producing starch nitrates which comprises the steps of first dissolving starch in nitric acid of at least 90% concentration by weight of $HNO_3$, forming a starch nitrate solution, then precipitating said starch nitrate in a precipitating bath consisting essentially of aqueous nitric acid of from 40 to 55% concentration by weight of $HNO_3$, and thereafter separating the bulk of the nitric acid from the precipitated starch nitrates, and removing residual acid from the latter by washing counter-currently with nitric acid of decreasing concentration and in the last step with water, and returning residual nitric acid having a concentration of nearly 50% by weight of $HNO_3$ to the precipitation stage.

References Cited in the file of this patent

UNITED STATES PATENTS

| 1,211,761 | Sadtler | Jan. 9, 1917 |
| 1,311,017 | Skoglund | July 22, 1919 |
| 2,127,360 | Helle et al. | Aug. 16, 1938 |
| 2,310,862 | Nessler | Feb. 9, 1943 |
| 2,400,287 | Caesar | May 14, 1946 |
| 2,776,964 | McMillian et al. | Mar. 28, 1956 |
| 2,776,966 | McMillian et al. | Mar. 28, 1956 |

FOREIGN PATENTS

| 14,625 | Great Britain | 1890 |